United States Patent
Reed et al.

(10) Patent No.: US 8,072,352 B2
(45) Date of Patent: *Dec. 6, 2011

(54) CROSS TRAFFIC ALERT WITH PARKING ANGLE TRAJECTORY

(75) Inventors: Eric L. Reed, Livonia, MI (US); Steven Y. Schondorf, Dearborn, MI (US); Brian Bennie, Sterling Heights, MI (US); Thomas M. McQuade, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/431,151

(22) Filed: Apr. 28, 2009

(65) Prior Publication Data

US 2010/0271238 A1    Oct. 28, 2010

(51) Int. Cl.
  *G08G 1/14* (2006.01)
(52) U.S. Cl. ............ 340/932.2; 340/903; 340/435

(58) Field of Classification Search ............ 340/903, 340/932.2, 435, 438, 425.5; 348/148; 180/168, 180/169; 701/28, 41, 42, 301
See application file for complete search history.

(56) References Cited

U.S. PATENT DOCUMENTS

| | | | |
|---|---|---|---|
| 2007/0279199 A1* | 12/2007 | Danz et al. | 340/435 |
| 2008/0211644 A1* | 9/2008 | Buckley et al. | 340/435 |
| 2008/0306666 A1* | 12/2008 | Zeng et al. | 701/70 |
| 2009/0045928 A1 | 2/2009 | Rao et al. | |
| 2010/0271237 A1* | 10/2010 | Reed et al. | 340/932.2 |

* cited by examiner

*Primary Examiner* — Brent Swarthout
(74) *Attorney, Agent, or Firm* — Frank A. MacKenzie, Esq.; MacMillan, Sobanski & Todd, LLC

(57) ABSTRACT

The subject of the present invention is a host vehicle that determines a parking angle while backing out of a parking space and employs this parking angle when using a cross traffic alert system. The parking angle is determined based on the trajectories of the host vehicle and a target vehicle. The parking angle is used to determine areas of interest and areas not of interest within the fields of view of vehicle mounted sensors. The areas of interest are those used to determine if cross traffic alerts need to be issued.

11 Claims, 3 Drawing Sheets

CROSS TRAFFIC ALERT WITH PARKING ANGLE TRAJECTORY

BACKGROUND OF THE INVENTION

The present invention relates generally to a vehicle having a rear crossing path detection and warning system and method for assisting vehicle operators in backing out of parking spaces.

Vehicle technologies that assist drivers with parking may increase convenience and safety for vehicle operators. One such technology is cross traffic alert, which assists vehicle operators who are backing out of parking spaces by warning if cross traffic is approaching the back of the host vehicle on a potentially intersecting trajectory with the host vehicle. Such systems are somewhat limited in effectiveness, however, due to variations in parking space configurations, angles and parking lot infrastructure from one parking lot to the next. This makes the system somewhat less reliable in sorting out infrastructure and approaching vehicles where a driver alert is desired from extraneous/non-threatening objects where a false alert may be generated. Due to this limitation, a tradeoff is employed where some false alerts are allowed and are balanced against a possibility that some targets might be missed. This system tradeoff is undesirable for some vehicle operators, and hence, a more accurate system is desired.

SUMMARY OF THE INVENTION

An embodiment contemplates a method of cross traffic alert with parking angle trajectory determination for a host vehicle backing out of a parking space, the method comprising the steps of: beginning to back the host vehicle from the parking space; detecting a target vehicle on a potentially intersecting trajectory with the host vehicle; determining a trajectory of the target vehicle relative to a trajectory of the host vehicle; calculating a parking angle based on the trajectory of the target vehicle relative to the trajectory of the host vehicle; from a field of view of a first side sensor, determining a first side portion of interest where an object detected by the first side sensor will be considered for a cross traffic alert and a first side portion not of interest where an object detected by the first side sensor will not be considered for the cross traffic alert, with the sizes of the first side portion of interest and the first side portion not of interest being based on the calculated parking angle; and activating the cross traffic alert when the vehicle is backing out of the parking space if an object is detected in the first side portion of interest.

An advantage of an embodiment is that the determination of the parking angle for the host vehicle by detecting target vehicle trajectories allows for a more accurate cross traffic alert system for vehicle operators. Knowing the parking angle from target vehicle trajectories allows for an expanded field of view for the sensors, where the system focuses only on the portions of the expanded fields of view that are relevant for that particular parking angle. Accordingly, less false alerts and less possibly missed targets are achieved while an operator is backing out of a parking space, thus providing the operator with more confidence in warnings generated by the cross traffic alert system.

DETAILED DESCRIPTION

Figure 1:
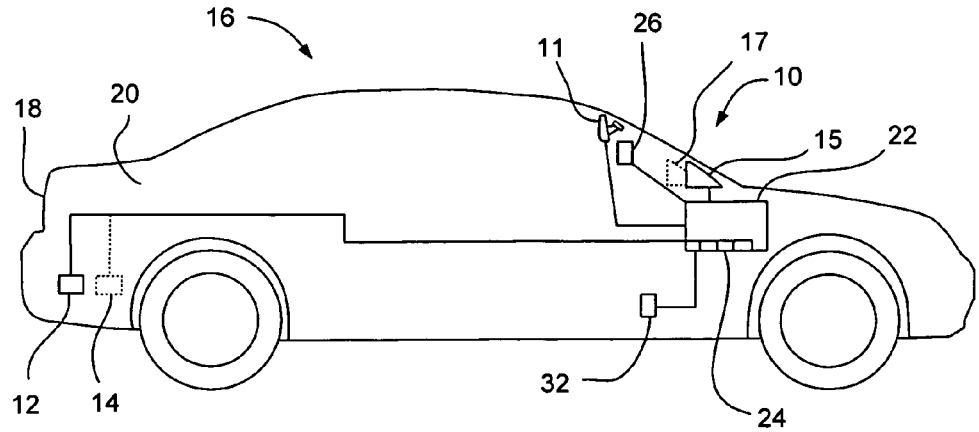
FIG. 1 shows a schematic, elevation view of a vehicle having a parking assist system.

FIG. 1 shows a host vehicle 16 that includes a parking assist system 10. The system 10 includes a pair of radar sensors, a right radar sensor 12 and a left radar sensor 14, one on each side 20 near the rear end 18 of the vehicle 16. The sensors 12, 14 communicate with an electronic control unit (ECU) 22 that may control the system 10. The host vehicle 16 may also include a right side view mirror 15, a left side view mirror 17 and a rear view mirror 11. One or more of the mirrors 11, 15, 17 may be in communication with the ECU 22 and may include a visual or audio alert capability that can be activated by the ECU 22 for rear crossing path warnings when the vehicle 16 is backing up. Alternatively, or in addition, an instrument panel alarm 26 may be in communication with the ECU 22 that includes a visual, audible or other alert capability that can be activated by the ECU 22 for rear crossing path warnings. A speedometer 32 or other means of measuring vehicle velocity is also in communication, either directly or indirectly, with the ECU 22.

The ECU 22 may include memory 24, such as PROM, EPROM, EEPROM, Flash, or other types of memory, which may include data tables stored therein. The ECU 22 may include multiple separate processors in communication with one another and may be made up of various combinations of hardware and software as is known to those skilled in the art.

Figure 2:
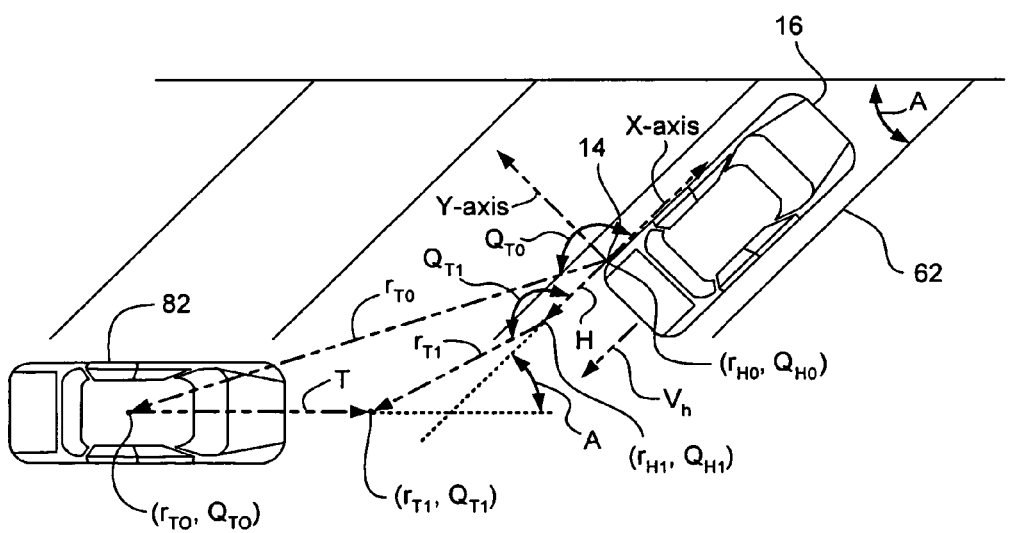
FIG. 2 shows a schematic diagram illustrating a portion of a method that can be employed for parking angle determination.
Figure 3:
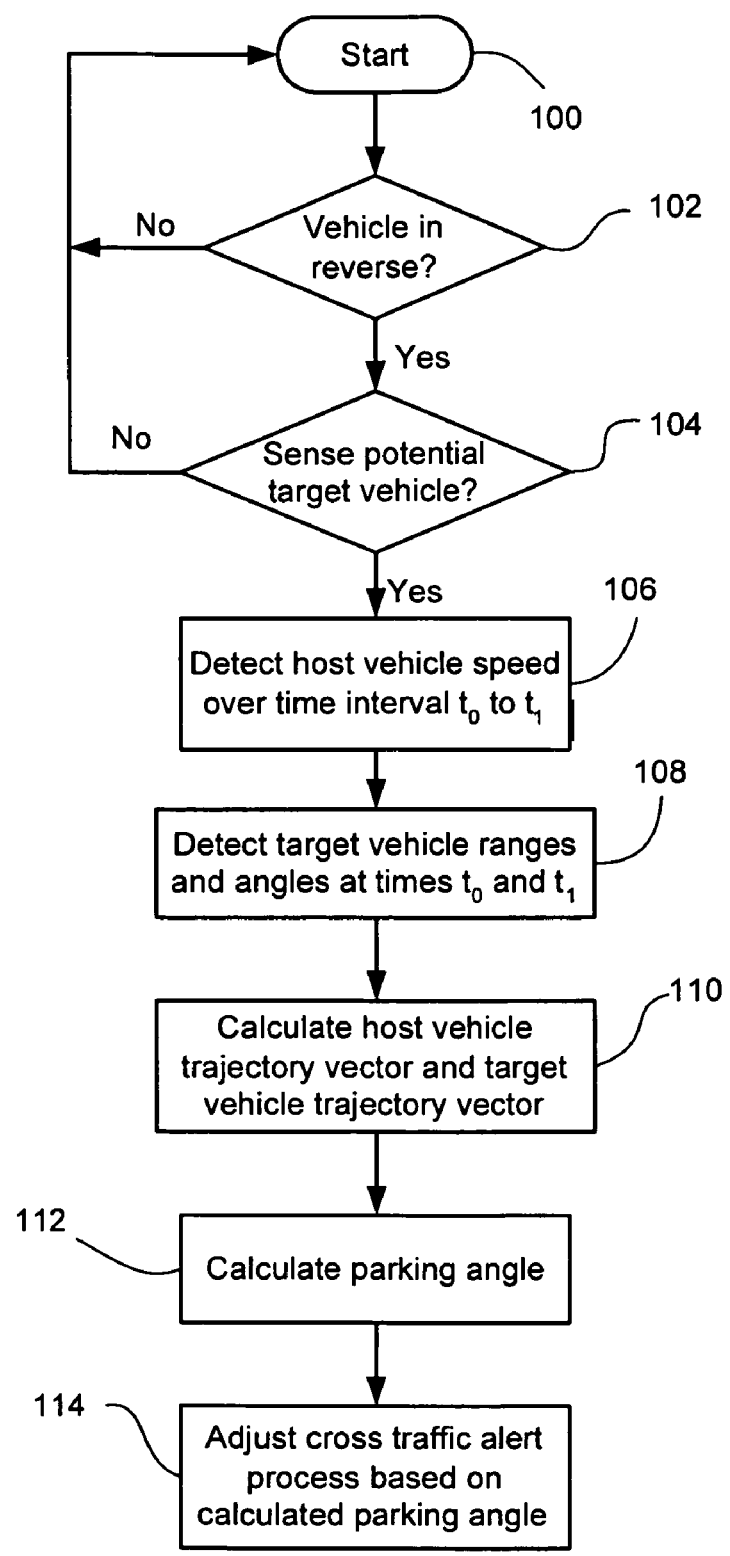
FIG. 3 is a flow chart illustrating a process that may be carried out by the parking assist system of FIG. 1 that forms a portion of the parking angle determination and assist method.

FIG. 2 is a schematic diagram illustrating parking angle determination and will be discussed with FIG. 3, defining a process employing parking angle determination with cross traffic alert. The processes described relative to FIGS. 2 and 3 may be carried out by the ECU 22 in the parking assist system 10 of FIG. 1. In this example, the target vehicle 82 is coming from the left side of the host vehicle 16, but the process also works for target vehicles coming from the right side of the vehicle as well. As the process starts, block 100, a determination is made as to whether the host vehicle 16 is in reverse, block 102. If so, then a determination is made as to whether a potential target vehicle is sensed, block 104. The situation, then, is one where the host vehicle 16 is backing out of a parking space 62 while a target vehicle 82, within the range of the left radar sensor 14, is traveling along the parking spaces.

As the host vehicle 16 is in reverse and begins to back up, host vehicle velocity ($V_h$) information is obtained over a time interval $t_0\,t_1$, block 106, where initial time $t_0=0$ and time $t_1$ is the time for the host vehicle 16 to travel from an initial point $(r_{H0}, Q_{H0})$ to point $(r_{H1}, Q_{H1})$. The point $(r_{H0}, Q_{H0})$ may be the location of the left radar sensor 14 at time $t_0$. These points may be defined in a cylindrical coordinate system with the origin $(0,0)$ at the location of the sensor 14 at time $t_0$, thus, $(r_{H0}, Q_{H0})$ would be at the origin. The point $(r_{H1}, Q_{H1})$ is the new location of the sensor 14 at time $t_1$. The host vehicle trajectory, then, is a calculation of the distance traversed in the time interval $t_0$ to $t_1$ (i.e., $V_h(t_1-t_0)$), which will determine the coordinates for point $(r_{H1}, Q_{H1})$.

Using sensor range and angle information, a target vehicle trajectory is defined using the same start and end times (i.e., $t_0$ and $t_1$) as used with the host vehicle trajectory. That is, at time $t_0$ a range $r_{T0}$ and an angle $Q_{T0}$ are detected by the left sensor 14, which defines a point ($r_{T0}$, $Q_{T0}$) in cylindrical coordinates that defines the location of the target vehicle 82 relative to the host vehicle 16 at time $t_0$. Also, at time $t_1$ a range $r_{T1}$ and an angle $Q_{T1}$ are detected by the left sensor 14, which defines a point ($r_{T1}$, $Q_{T1}$) in cylindrical coordinates that defines the location of the target vehicle 82 relative to the host vehicle 16 at time $t_1$, block 108. The cylindrical coordinates may then be converted to Cartesian coordinates in a host vehicle Cartesian coordinate system (i.e., an X-axis parallel to the host vehicle trajectory and a Y-axis normal to the X-axis at the initial location of the sensor 14), and the parking angle A determined.

The parking angle A is defined as the resultant angle of the target and host vehicle trajectories and is determined using the following equations. First, a target vehicle trajectory vector T is found from the equation $T=\{(-r_{T1} \cos Q_{T1} + r_{T0} \cos Q_{T0} - V_h(t_1-t_0)), (r_{T1} \sin Q_{T1} - r_{T0} \sin Q_{T0})\}$, and a host vehicle trajectory vector H is found from the equation $H=\{-V_h(t_1-t_0), 0\}$. Then, the parking angle A is determine using the equation $A = \arccos((T \cdot H)/|T||H|)$, block 112, which is the arccosine of the dot product of the vectors divided by the product of the magnitudes of the vectors. Also, since we know the parking angle on the left side of the vehicle, the parking angle on the right side is easily calculated (i.e., 180 degrees minus angle A) so that cross traffic alert monitoring is improved for both sides of the vehicle. Once the parking angle A is known, the cross traffic alert may be modified based on this calculated parking angle A, block 114. Such a cross traffic alert process that advantageously employs the parking angle is described with reference to FIGS. 4 and 5.

Figure 4:
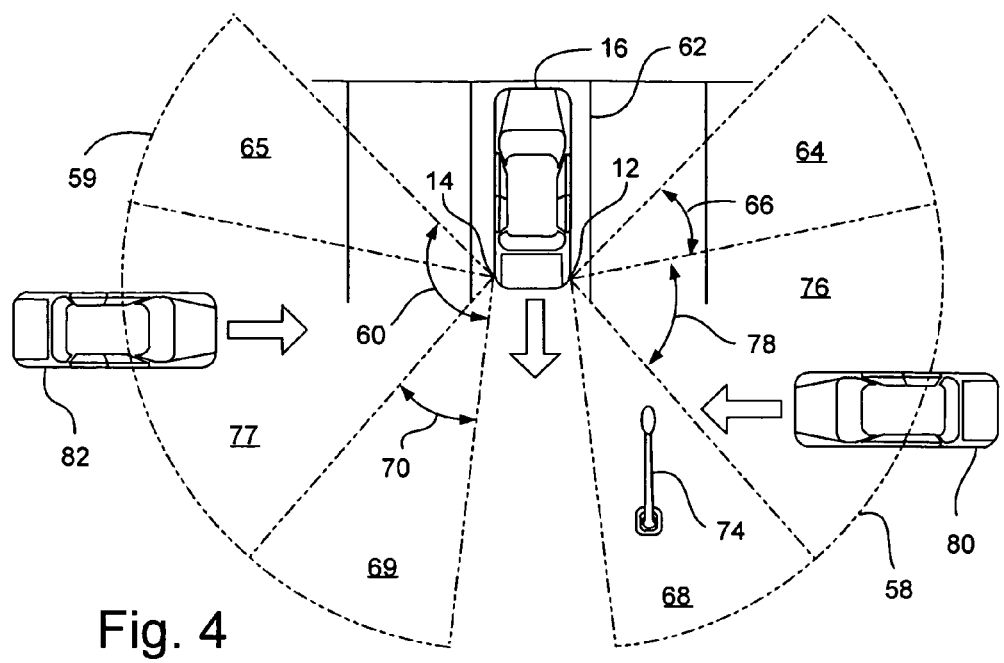
FIG. 4 is a schematic, plan view of a vehicle parking situation.

FIG. 4 shows an example of a parking situation where the parking angle may be employed to improve a cross traffic alert process. For this example, the parking angle for this parking space 62 is ninety degrees to the cross traffic, with this angle determined employing the method described relative to FIGS. 2 and 3 for a host vehicle 16, such as in FIG. 1.

When the host vehicle 16 is in reverse gear and backing out of the parking space 62, the radar sensors 12, 14 are activated to detect objects that may be on a trajectory to cross paths with the host vehicle 16. The radar sensors 12, 14 preferably have wide right and left sensor fields of view 58, 59, respectively, with each having a large total view angle 60. The phantom lines in FIG. 4 (and FIG. 5) represent fields of view for the sensors 12, 14. In this example, the parking angle is known (employing the process of FIGS. 2 and 3). For this particular parking angle, parts of this wide total viewing angle 60 are not needed for cross traffic alert. Thus, a right forward portion 64 and a left forward portion 65 of the total fields of view 58, 59, respectively, each having a small forward view angle 66, are areas where detected objects are ignored for purposes of cross traffic alerts. Also, a right rear portion 68 and a left rear portion 69 of the total fields of view 58, 59, respectively, each having a small rear view angle 70, are areas where detected objects are ignored for purposes of cross traffic alert. For example, infrastructure, such as a lamp post 74, may be ignored.

What remains are a right portion of interest 76 and a left portion of interest 77, each having a view angle 78 that is smaller than the total viewing angle 60 but large enough to cover the areas of interest within the total field of view. For example, a right target vehicle 80 may be in the right portion of interest 76, which may trigger a cross traffic alert. The left target vehicle 82 may be in the left portion of interest 77, which may trigger a cross traffic alert. Knowing the parking angle, then, allows the areas of interest for cross traffic alert to be determined and also allows the areas that are not of interest to be ignored. By ignoring particular portions of the field of view, nuisance alerts can be significantly reduced while not compromising the field of view where object detection is more important.

Alternatively, or in addition to the above, if the radar sensors are part of a multi-beam system, then the beam pattern may be adjusted to increase the energy directed toward the areas of interest while the beam energy directed toward the areas not of interest is reduced.

Figure 5:
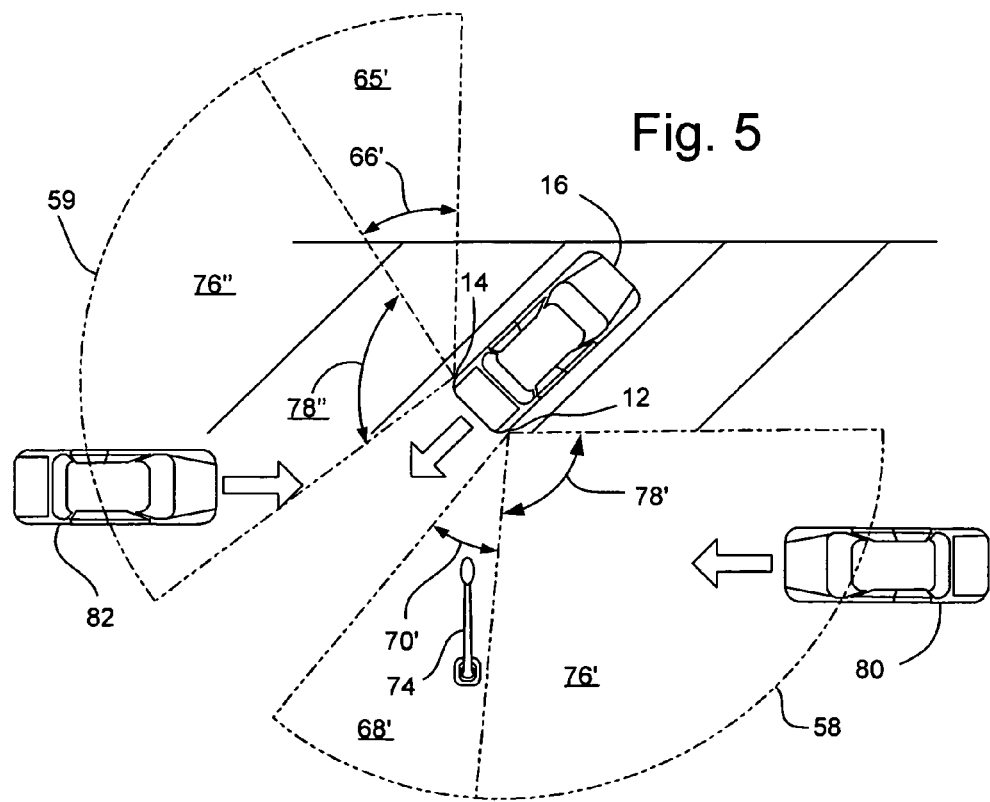
FIG. 5 shows a schematic, plan view of another vehicle parking situation.

FIG. 5 shows an example of another parking situation where the parking angle may be employed to improve the cross traffic alert process. In this example, the parking angle is about 45 degrees from the direction of flow of cross traffic. For this parking angle, when the host vehicle 16 is in reverse gear and backing out of the parking space 62, the radar sensors 12, 14 are activated to detect objects that may be on a trajectory to cross paths with the host vehicle 16.

Since the host vehicle 16 is now at an angle other than a normal angle to the cross traffic, the areas of interest and the areas not of interest for cross traffic are not symmetrical on the right and left sides of the host vehicle 16. On the right side of the host vehicle 16, the right wide field of view 58 sensed by the right sensor 12 may now be broken down into only two portions, a right rear portion 68', having a rear view angle 70', where detected objects are ignored, and a right portion of interest 76', having a view angle 78', where detected objects are of interest for cross traffic alert purposes. For example, the lamp post 74 may be ignored while the right target vehicle 80 may trigger a cross traffic alert.

On the left side of the host vehicle 16, the left wide field of view 59 sensed by the left sensor 14 may also now be broken down into only two portions, a left forward portion 65', having a forward view angle 66', where detected objects are ignored, and a left portion of interest 76", having a view angle 78", where detected objects are of interest for cross traffic purposes. For example, the left target vehicle 82 may trigger a cross traffic alert. Of course, for both the left and right sides, the wide fields of view 58, 59 may still be broken down into three portions, depending upon the angle at which the host vehicle 16 is parked and the determination as to how large of an angle the areas of interest 76, 77 should cover.

In the instances where a target vehicle trajectory is not detected as the host vehicle is backing out of a parking space, a default parking angle and/or default angle for the width of the fields of interest may be set.

While certain embodiments of the present invention have been described in detail, those familiar with the art to which this invention relates will recognize various alternative designs and embodiments for practicing the invention as defined by the following claims.

What is claimed is:

1. A method of cross traffic alert with parking angle trajectory determination for a host vehicle backing out of a parking space, the method comprising the steps of:
   (a) beginning to back the host vehicle from the parking space;
   (b) detecting a target vehicle on a potentially intersecting trajectory with the host vehicle;
   (c) determining a trajectory of the target vehicle relative to a trajectory of the host vehicle;
   (d) calculating a parking angle based on the trajectory of the target vehicle relative to the trajectory of the host vehicle;

(e) from a field of view of a first side sensor, determining a first side portion of interest where an object detected by the first side sensor will be considered for a cross traffic alert and a first side portion not of interest where an object detected by the first side sensor will not be considered for the cross traffic alert, with the sizes of the first side portion of interest and the first side portion not of interest being based on the calculated parking angle; and (f) activating the cross traffic alert when the vehicle is backing out of the parking space if an object is detected in the first side portion of interest.

2. The method of claim 1 wherein the first side is a right side of the vehicle, the first side portion of interest is a right side portion of interest and the first side portion not of interest is a right side portion not of interest, and step (e) is further defined by:

from a field of view of a left side sensor, determining a left side portion of interest where an object detected by the left side sensor will be considered for the cross traffic alert and a left side portion not of interest where an object detected by the left side sensor will not be considered for the cross traffic alert, with the sizes of the left side portion of interest and the left side portion not of interest being based on the calculated parking angle.

3. The method of claim 2 wherein step (f) is further defined by:

activating the cross traffic alert when the vehicle is backing out of the parking space if an object is detected in the right side portion of interest or the left side portion of interest.

4. The method of claim 3 wherein step (f) is further defined by:

not activating the cross traffic alert when the vehicle is backing out of the parking space if an object is detected in the right side portion not of interest or the left side portion not of interest but no object is detected in the right side portion of interest or the left side portion of interest.

5. The method of claim 1 wherein step (b) is further defined by:

using a predetermined default angle for the parking angle if no target vehicle on a potentially intersecting trajectory with the host vehicle is detected.

6. The method of claim 1 wherein step (f) is further defined by:

activating a visual alert that is visible to a vehicle operator when the cross traffic alert is activated.

7. The method of claim 1 wherein step (f) is further defined by:

activating an audio alert that can be heard by a vehicle operator when the cross traffic alert is activated.

8. The method of claim 1 wherein step (c) is further defined by:

obtaining a host vehicle velocity $V_h$ over a time interval $t_0$ to $t_1$, where $t_0$ is an initial time when the host vehicle is at an initial point $(r_{H0}, Q_{H0})$ and $t_1$ is a time when the vehicle has traveled to a point $(r_{H1}, Q_{H1})$, and where $r_{H0}$ and $r_{H1}$ are radial distances in a cylindrical coordinate system defined relative to the host vehicle and $Q_{H0}$ and $Q_{H1}$ are angles in the defined vehicle coordinate system; and obtaining an initial range $r_{T0}$ and initial angle $Q_{T0}$ for the target vehicle in the host vehicle cylindrical coordinate system at time $t_0$, and obtaining another range $r_{T1}$ and angle $Q_{T1}$ for the target vehicle in the coordinate system at time $t_1$.

9. The method of claim 8 wherein step (c) is further defined by:

calculating a target vehicle trajectory vector T from the equation $T=\{(-r_{T1} \cos Q_{T1} + r_{T0} \cos Q_{T0} - V_h(t_1-t_0)), (r_{T1} \sin Q_{T1} - r_{T0} \sin Q_{T0})\}$; and calculating a host vehicle trajectory vector H from the equation $H=\{-V_h(t_1-t_0), 0\}$.

10. The method of claim 9 wherein step (d) is further defined by:

calculating a parking angle A from the equation $A=\arccos((T \cdot H)/|T||H|)$, where $(T \cdot H)$ is a dot product of the host and target vehicle trajectory vectors, $|T|$ is a magnitude of the target vehicle trajectory vector T and $|H|$ is a magnitude of the host vehicle trajectory vector H.

11. The method of claim 1 comprising step (g):

employing a multi-beam system as the first side sensor, and increasing an energy sent to the first side portion of interest while decreasing the energy sent to the first side portion not of interest.

* * * * *